United States Patent [19]

Takagi

[11] Patent Number: 5,655,161

[45] Date of Patent: Aug. 5, 1997

[54] PHOTOMETRIC DEVICE FOR A CAMERA

[75] Inventor: Tadao Takagi, Yokohama, Japan

[73] Assignee: Nikon Corporation, Tokyo, Japan

[21] Appl. No.: 740,082

[22] Filed: Oct. 24, 1996

Related U.S. Application Data

[63] Continuation of Ser. No. 208,568, Mar. 10, 1994, abandoned

[30] Foreign Application Priority Data

Mar. 12, 1993 [JP] Japan .................. 5-052632

[51] Int. Cl.⁶ .................................................. G03B 7/099
[52] U.S. Cl. .................................... 396/271; 396/274
[58] Field of Search ........................... 396/268, 271, 396/272, 274

[56] References Cited

U.S. PATENT DOCUMENTS

| | | | |
|---|---|---|---|
| 4,152,054 | 5/1979 | Leiter | 354/23 |
| 4,180,312 | 12/1979 | Schmidt et al. | 354/59 |
| 4,427,277 | 1/1984 | Haraguchi | 354/402 |
| 4,615,602 | 10/1986 | Eguchi | 354/478 |
| 5,033,844 | 7/1991 | Itabashi | 354/406 |
| 5,278,607 | 1/1994 | Goto et al. | 354/476 |
| 5,359,364 | 10/1994 | Kayanuma et al. | 348/343 |

FOREIGN PATENT DOCUMENTS

A-63-266436  11/1988  Japan .
U-4-104610  9/1992  Japan .

Primary Examiner—Russell E. Adams
Assistant Examiner—J. K. Han
Attorney, Agent, or Firm—Oliff & Berridge

[57] ABSTRACT

The present invention provides a photometric device for a camera in which the relative positions of the photometric sensor and a secondary image formed on the sensor can be adjusted with high resolution and which also facilitates adjustment in a plurality of directions.

A photometric device for a camera according to the present invention comprises a photometric sensor that internally provided in the camera body and that can perform photometry on the photographing field, a photometric lens which re-forms the image of the field originally formed as the primary image on the viewfinder screen of the camera as a secondary image on the photometric sensor, and a tilt adjusting mechanism that integrally adjusts the inclination of the photometric lens and the photometric sensor against incident light rays entering the photometric lens.

22 Claims, 7 Drawing Sheets

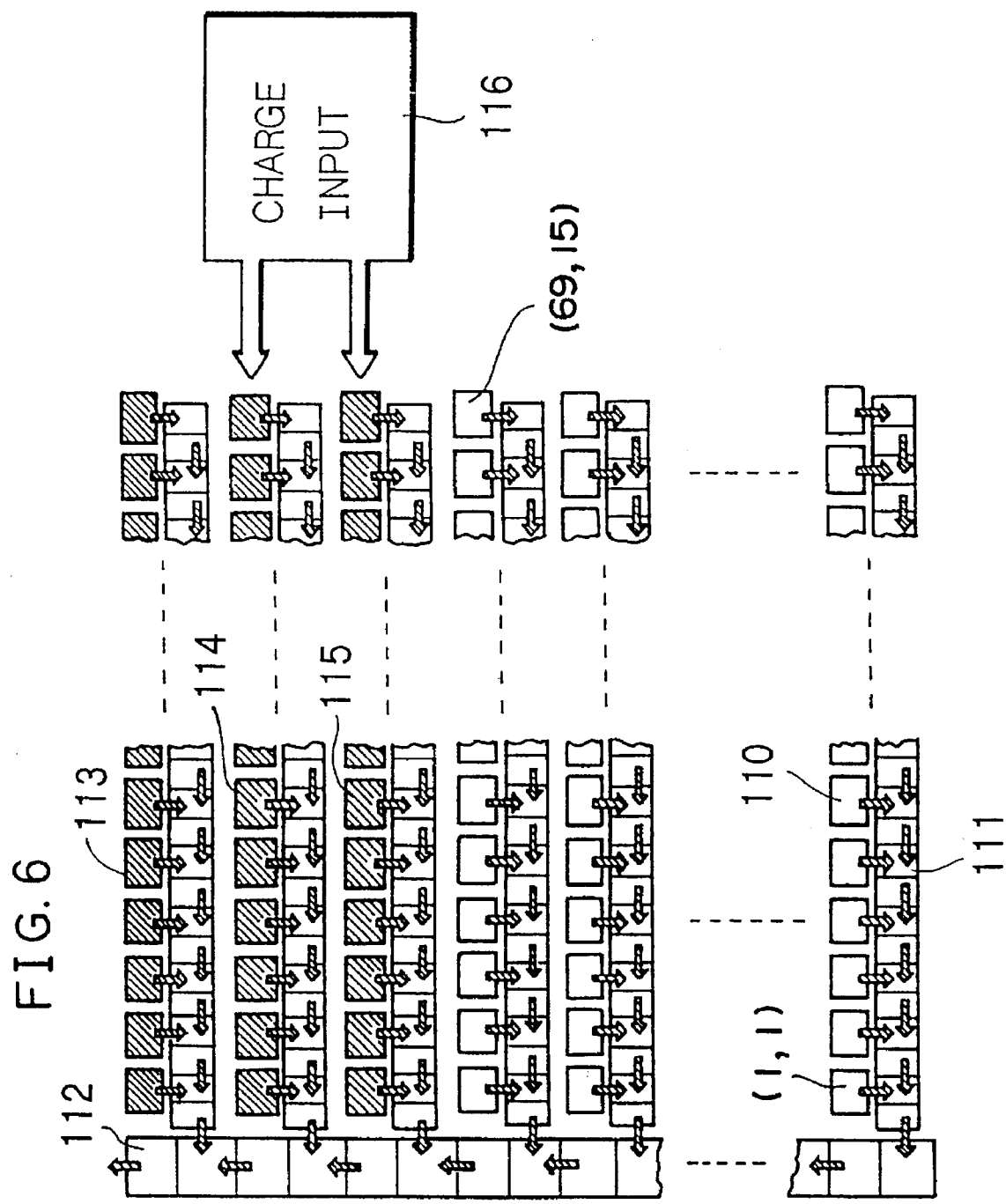

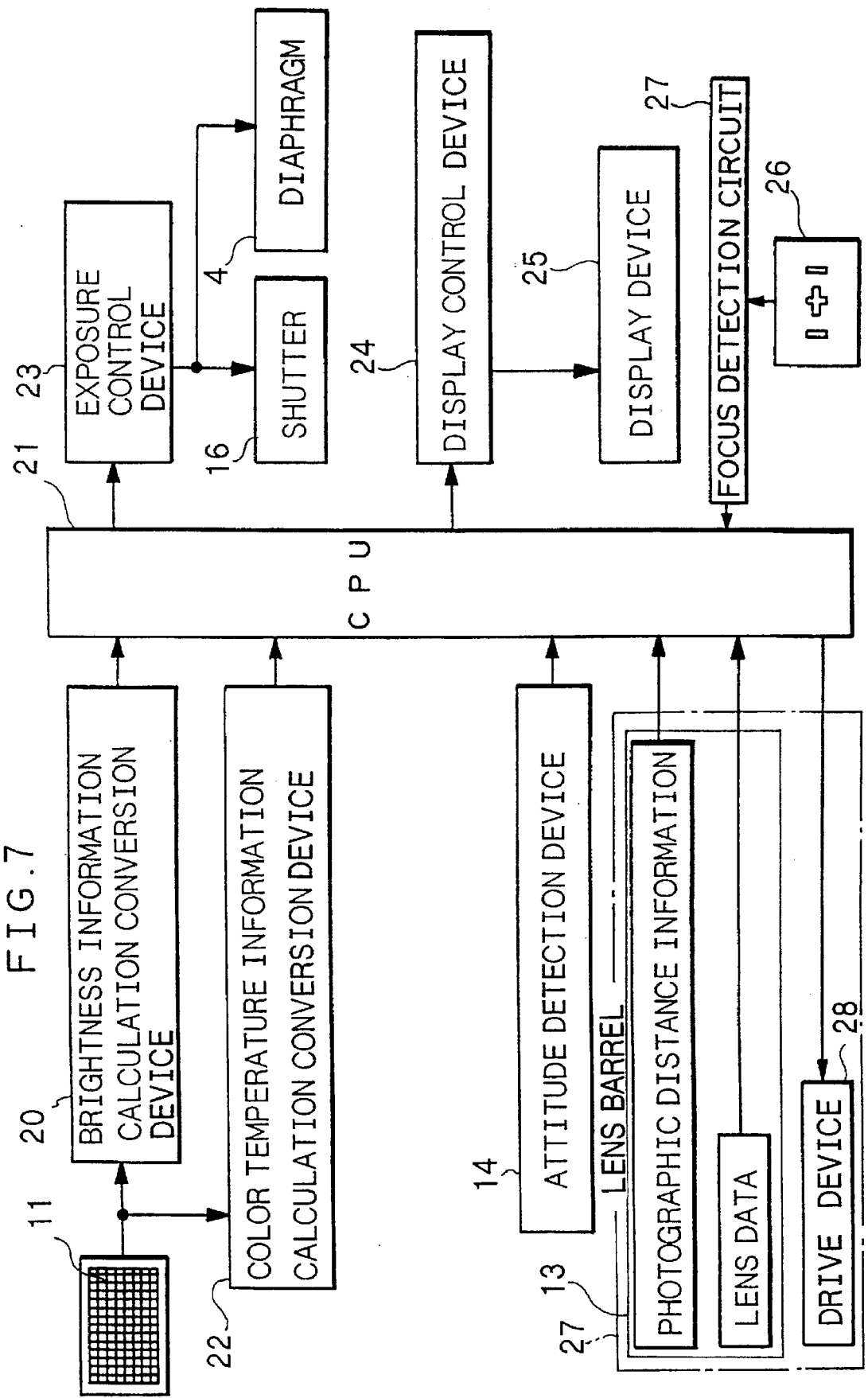

PHOTOMETRIC DEVICE FOR A CAMERA

This is a continuation of application Ser. No. 08208,568 filed Mar. 10, 1994, now abandoned.

BACKGROUND OF THE INVENTION

1. Field of the Invention

The present invention relates to a photometric device for a camera that uses the primary image formed on the camera's viewfinder screen to form a secondary image on the photometric sensor with a photometric lens.

2. Description of the Related Art

With the type of camera described above, the photographer's desired exposure may not be always achieved, since, if the image forming position of the secondary image on the photometric sensor has deviated from the design position, the photometric range which the photographer verifies through the viewfinder does not align with the range that the photometric sensor actually measures. Because of this, in the photometric device for a camera disclosed in Japanese Utility Model laid-open Application No.4-104610, a photometric sensor is provided at the focal surface of the photometric lens and is moved within the focal surface with the rotation of a decentering pin to enable adjustment of the image forming position of the secondary image on the photometric sensor.

In the device disclosed in the above mentioned publication, with one full rotation of the decentering pin, the photometric sensor returns to its original position, and it is necessary to determine the ideal position for the photometric sensor while the decentering pin is turning. As a result, fine adjustment of the position is difficult and sufficient resolving power may not be obtained with a photometric sensor that divides its light receiving portion into a great many sections to perform photometry on the photographic field or when a photometric lens with high magnification is used. Also, with the above mentioned device, when the decentering pin is rotated, the direction in which the photometric sensor moves changes in correspondence to the change in the direction the decentering pin travels. Because of this, the photometric sensor cannot be moved in a given direction continuously, resulting in further difficulty in adjustment.

SUMMARY OF THE INVENTION

The object of the present invention is to provide a photometric device for a camera that enables adjustment of the relative position of the photometric sensor and a secondary image formed on it with high resolving power and which facilitates adjustment in any direction.

The photometric device for a camera according to the present invention is provided with a photometric sensor that is internally mounted in the camera body and that can perform photometry on the photographic field, a photometric lens which re-forms the image of the field which is initially formed as the primary image on the camera's viewfinder screen, as a secondary image on the photometric sensor, and a tilt adjusting mechanism that integrally adjusts the angle of the photometric lens and the photometric sensor against the incident light entering the photometric lens.

In the present invention, when the angles of the photometric lens and the photometric sensor are integrally adjusted with the tilt adjusting mechanism, the image forming position of the secondary image on the photometric sensor changes in the direction that corresponds with the tilt.

The tilt adjusting mechanism described above may be provided with, for example, a holding member that integrally holds the photometric lens and the photometric sensor and a supporting mechanism that supports this holding member in such a way that the angle against the incident light entering the photometric lens can be adjusted. Preferably, the supporting mechanism should comprise a supporting member that supports the holding member at three points in the direction of the incident light entering the photometric lens, and a support height adjusting mechanism that adjusts the height of the support for the holding member provided by the supporting member. It is desirable to arrange the points of support in the form of a right angle triangle. Furthermore, it will be ideal to arrange them so that two sides of the right angle triangle that is formed by connecting the points of support run parallel to the long sides and the short sides of the rectangular secondary image formed on the photometric sensor. An elastic member such as coil springs is used for the supporting member and the support height adjusting mechanism is provided with an elastic deformation adjusting member for adjusting the amount of elastic deformation of the elastic member. For the elastic deformation adjusting member, screws may be used, which can be screwed from one side to the other side of the holding member and the camera body in such a manner that the elastic member is elastically deformed in the direction of the support of the holding member. When using coil springs for the elastic member and screws for the elastic deformation adjusting member, the screws can be mounted inside and coaxially with the coil springs. It is desirable to provide the holding member that holds the photometric lens and the photometric sensor in such a manner that the distance between the photometric lens and the photometric sensor is adjustable. For example, a female threaded portion may be provided on the holder to which the photometric sensor is secured and a male threaded 5 portion may be provided on the outer circumference of the photometric lens. By screwing the male threaded portion into the female threaded portion on the holder, the distance between the photometric lens and the photometric sensor can be adjusted.

BRIEF DESCRIPTION OF THE DRAWING

FIG. 6 illustrates the circuit structure which enables extraction of the electric charge stored in the photometric sensor;

FIG. 7 is a block diagram of the control system of the camera in FIG. 3;

DESCRIPTION OF THE PREFERRED EMBODIMENT

Figure 3:
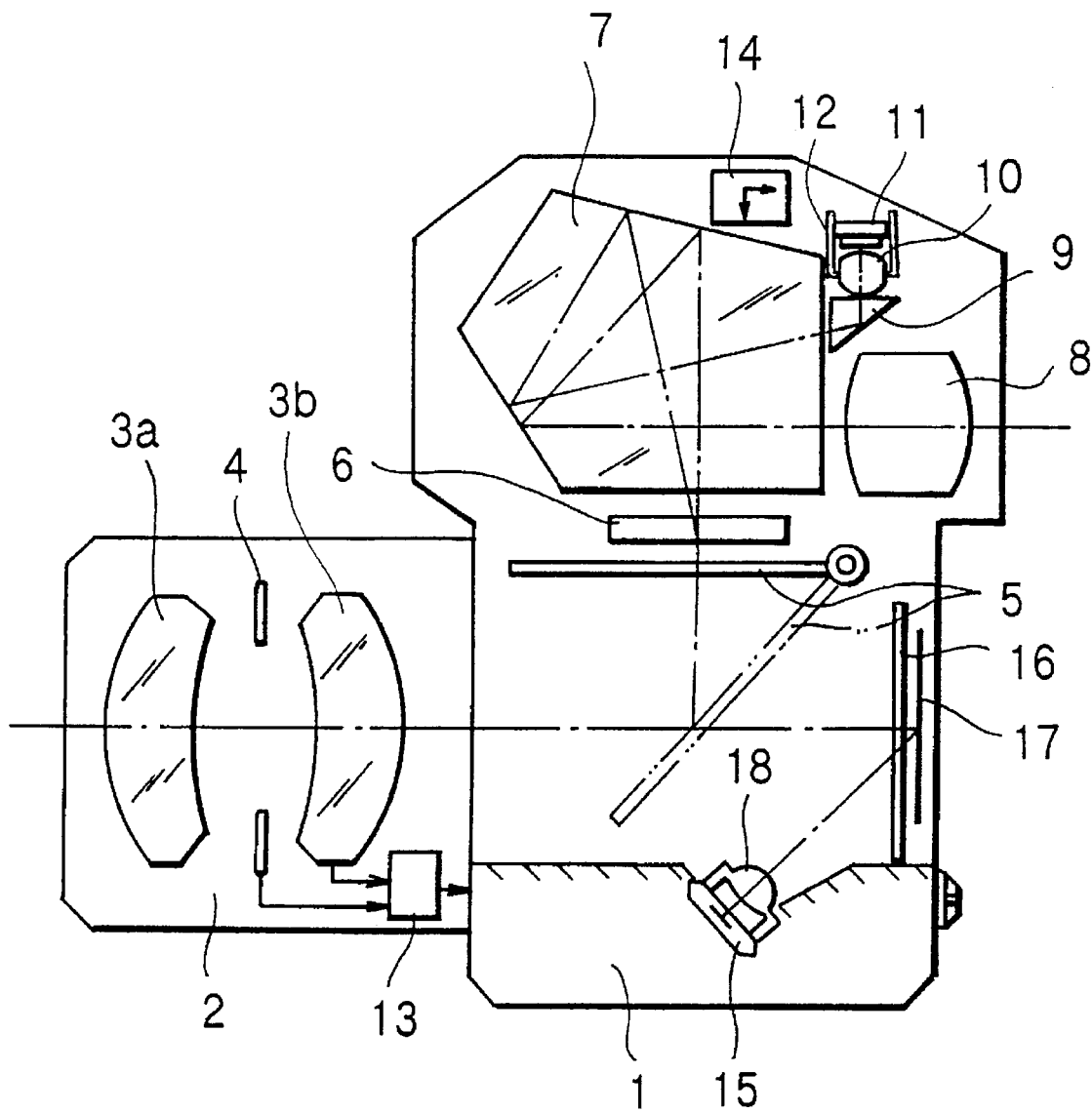
FIG. 3 is a longitudinal cross section of a camera in which the photometric sensor in FIGS. 1A and 1B is mounted.

In reference to FIGS. 3 through 7, the schematic structure of a camera in which the photometric device according to the present invention is mounted is explained. In FIG. 3, number 1 indicates the camera body, 2 indicates the lens barrel, which is detachable from the camera body 1, and 3a and 3b are the photographic lenses. Number 4 indicates the diaphragm and 5 indicates a mirror which can travel between the position indicated with solid lines and that indicated with two-dots chain lines in the figure. When the mirror 5 is at the position indicated with the two-dots chain lines, the light from the photographic field which has passed through the photographic lenses 3a, 3b is reflected by the mirror 5 and the primary image of the photographic field is formed on the viewfinder screen 6. The light that passes through the viewfinder screen 6 is then reflected by the pentaprism 7, enters the ocular lens 8 and finally reaches the eye of the photographer. With this, the photographer can verify the primary image formed on the viewfinder screen 6. Part of the light that exits from the pentaprism 7 enters the prism 9 which is provided over the ocular lens 8, is reflected inside the prism 9 and then enters the photometric lens 10. With the image forming effect of the photometric lens 10, the primary image which was originally formed on the viewfinder screen 6 is re-formed as a secondary image for photometric measurement on the light receiving surface of the photometric sensor 11. The photometric lens 10 and the photometric sensor 11 are integrated by the holder 12 and the details of this will be supplied later.

Number 13 indicates the intra-lens ROM that transmits the photographic distance information that corresponds with the position of the photographic lens 3b and the lens data that correspond with aperture value of the diaphragm 4 and the like to the camera body 1; 14 indicates an attitude detection device which identifies the attitude of the camera body 1, i.e. whether it is in a lateral position with the pentaprism 7 facing up, or a right-longitudinal position with the pentaprism 7 facing sideways to the right, or a left-longitudinal position with the pentaprism 7 facing sideways to the left. Number 15 indicates the photometric sensor, which is used for adjustment of the amount of light emitted by the flash device (not shown). When the flash device starts emitting light, which is linked with the opening operation of the shutter 16, its light is reflected by the subject, enters the photographic lenses 3a, 3b and finally reaches the film surface 17. The light reflected by the film surface 17 is converged by the lens 18 and is induced to the photometric sensor 15.

Figure 4:
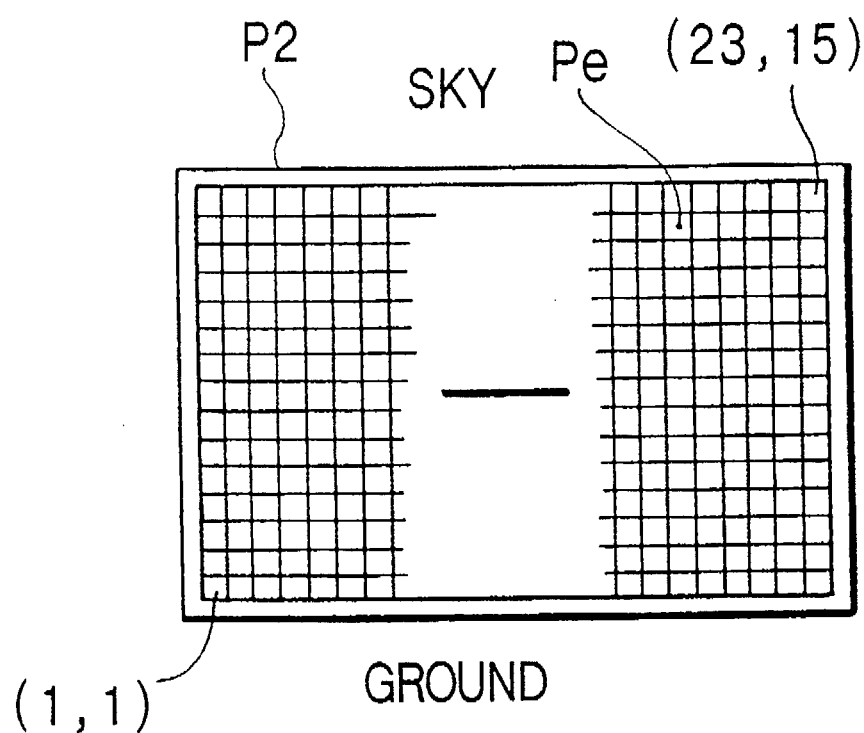
FIG. 4 illustrates the divided sections of the photometric range on which the photometric sensor in FIG. 3 performs photometry.

The photometric sensor 11 divides the secondary image of the photographic field which has been re-formed on its light receiving surface by the photometric lens 10 into a suitable number of sections and detects the brightness of each section. It then outputs signals that correspond to the results of the detection. There are various types of sensors that function in this way, but in this embodiment, a color 2-dimensional charge storage type image sensor, of the type often used in video cameras and the like, is used. FIG. 4 shows a dividing pattern of the secondary image of the photographic field by the photometric sensor 11. As shown in the figure, the photometric sensor 11 in this embodiment divides the secondary image P2 of the photographic field which is defined in rectangular form into a total of 345 sections Pe, 23 columns and 15 rows, to perform the photometry. Addressing of the photometric sections Pe is as follows: the address of the section that corresponds to the left end on the side of the ground in the photographic field is (1,1) and the address of the section that corresponds to the right end on the side of the sky in the photographic field is (23.15) when the camera body 1 is in the lateral position.

Figure 5:
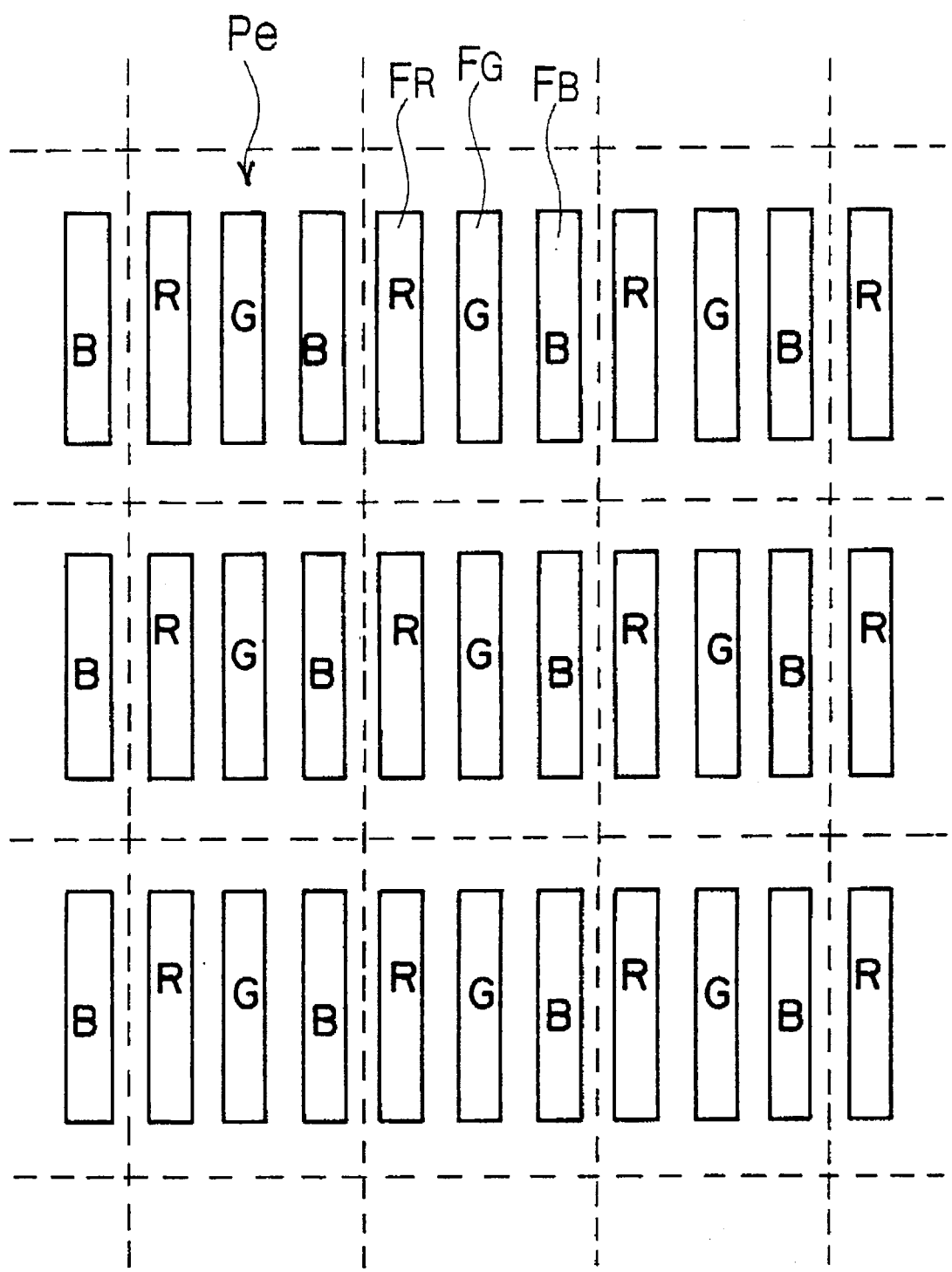
FIG. 5 is a partial enlargement of the photometric range of the photometric sensor in FIG. 4.

As shown in FIG. 5, the light receiving surface of the photometric sensor 11 is provided with three color filters, FR, FG and FB for R (red) G (green) and B (blue) in each photometric section Pe (areas surrounded by the dotted lines in the figure). Behind the filters FR, FG and FB, photoelectric conversion elements 110 (refer to FIG. 6) such as photo diodes are provided on a one-to-one basis. With this structure, the detection of brightness for each photometric section Pe and the colorimetry of the three primary colors for each photometric section Pe become possible. Note that the filters do not necessarily have to support the three primary colors, but may support their complementary colors.

As there are three photoelectric conversion elements 110 provided for each photometric section Pe, the entirety of the photometric sensor 11, as shown in FIG. 6, has 69 rows of photoelectric conversion elements 110 in the lateral direction and 15 rows in the longitudinal direction arranged as a matrix. Between the lateral rows of the photoelectric conversion elements 110, shift registers 111 are provided, and the electrical charges generated by the photoelectric conversion elements 110 are first stored in the storage section (not shown) for a specific period of time and then all the charges are transferred at once to the shift registers 111. The shift registers 111 then sequentially transfer the electrical charges from the photoelectric conversion elements 110 to the longitudinal register 112 which is provided at the left end of the shift registers 111 in response to a clock pulse. The longitudinal register 112 then transfers the electrical charges that have been transferred from the shift registers 111 in the upward direction in the figure. The transferred electrical charges are then converted into a voltage in a floating diffusion (not shown) and then output to an amplifier. The direction of transfer of the electrical charges is indicated in the figure with arrows.

At the upper space of the photoelectric conversion elements 110, located at the uppermost end in FIG. 6, three rows of optically dark areas 113, 114 and 115 are provided by arraying photoelectric conversion elements whose number is the same, and which are identical to the photoelectric conversion elements 110 with their light receiving surfaces shielded from light. Signals that are equivalent to the dark signal from the photoelectric conversion elements 110 (the electrical charge when the amount of incident light is 0) are output from the photoelectric elements of the optically dark area 113 at the uppermost position and each signal is taken out via the longitudinal register 112 from the shift register 111 to be converted into a voltage. By subtracting the voltage based on the signal from the optically dark area 113 from the output of the photoelectric conversion elements 110, correction for the dark signal from the photoelectric conversion elements 110 is performed.

Electrical charges of different sizes are input to the optically dark areas 114, 115 at the middle and lower position from the electrical charge input section 116. Since the output from the optically dark areas 114, 115 fluctuates in response to the temperature of the photoelectric conversion elements provided therein, output fluctuations caused by thermal factors, including that of the amplifier (not shown) which amplifies the output from the photometric sensor 11, can be corrected. The reason for providing the two rows of optically dark areas 114, 115 is to enable the $\gamma$ correction of the tilt as well as the offset correction when performing correction of the output in response to fluctuations in temperature.

As shown in FIG. 7, the output from the photometric sensor 11 is converted to a brightness value at the brightness information calculation conversion device 20, which is then input to the CPU 21. The output from the photometric sensor 11 is also converted to color temperature by the color temperature information calculation conversion device 22 to be input to the CPU 21. The CPU 21 calculates the optimum exposure value based upon the information from the two devices 20 and 22, the photographic distance information and lens data from the ROM 13 in the lens barrel 2 and the information for recognizing the attitude of the camera input from the attitude detection device 14. Then, in response to the operation of the release button (not shown) in which it is fully pressed, the CPU 21 outputs the exposure control signal which corresponds to the result of the calculation, to the exposure control device 23. The exposure control device 23, in turn, drives the shutter 16 and the diaphragm 4 in such a manner that the optimum exposure is achieved, based upon the exposure control signal. The calculated optimum exposure value is displayed on the display device 25 which may be a liquid crystal panel or the like, via the display control device 24. Number 26 indicates the focus detector which detects the focus adjustment condition at left, central and right positions in the photographic screen (the photographic field observed through the ocular lens 8) and after being processed in the focus detection circuit 27 its output is input to the CPU 21. The CPU 21 then calculates the in focus position based upon the focus information input from the focus detection circuit 27 and based upon the result of this calculation, it drives the drive device 28 inside the lens barrel to move the photographic lenses 3a, 3b to the in focus position with respect to the desired subject.

Figure 1A:
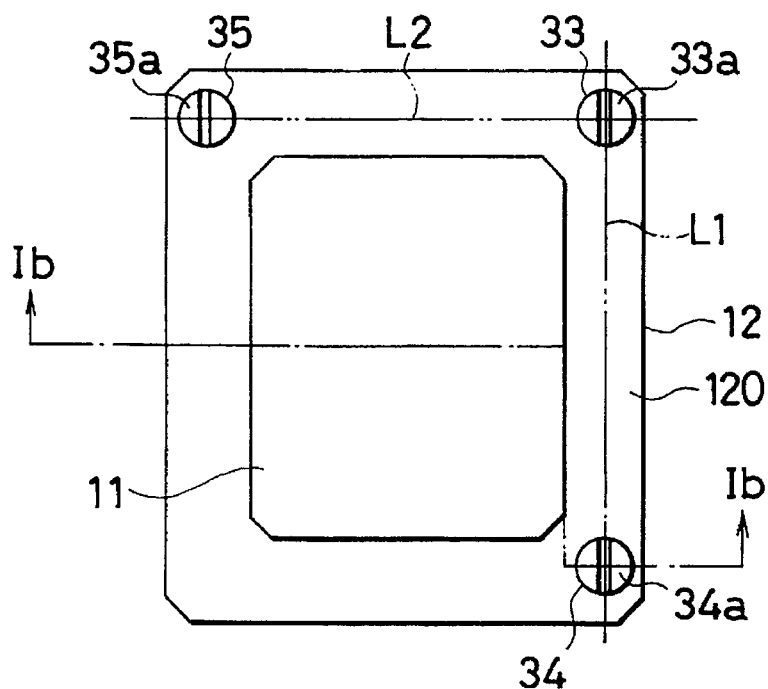
FIG. 1A is a plan view of a photometric sensor provided in the photometric device in an embodiment of the present invention.
Figure 1B:
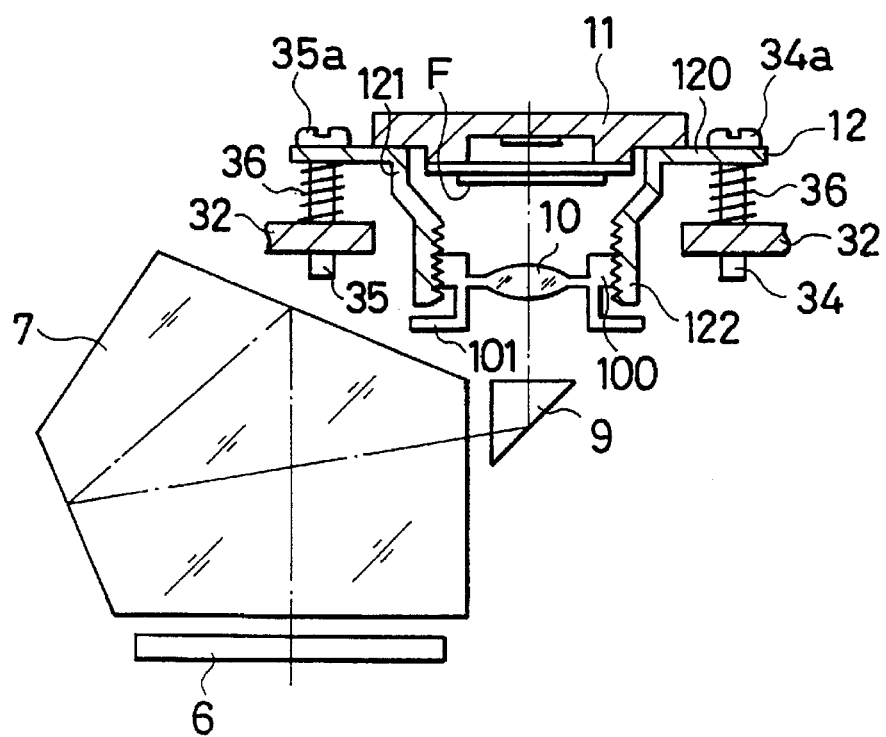
FIG. 1B is a cross section along line Ib—Ib in FIG. 1A.

Next, the support structure for the photometric lens 10 and photometric sensor 11, which is the featured part of this embodiment, is explained in reference to FIGS. 1A and 1B.

As shown in FIGS. 1A and 1B, the holder 12 is provided with a rectangular flange portion 120 and a hollow lens support portion 121 which projects out from the center of the flange portion 120. The photometric sensor 11 is secured to the flange portion 120 with its light receiving surface F facing inwards, toward the inside of the lens support portion 121. An adhesive may be used for securing the photometric sensor 11. A female threaded portion 122 is formed inside the end of the lens support portion 121. A male threaded portion 100 is formed as a part of the external circumference of the photometric lens 10 and the photometric lens 10 is attached on the holder 12 by screwing this male threaded portion 100 into the female threaded portion 122. The distance between the photometric sensor 11 and the photometric lens 10 is adjusted to a specific length by adjusting the screwing position of the male threaded portion 100 in relation to the holder 12. This specific length is a value which will enable an accurate re-formation of the primary image on the viewfinder screen 6 onto the light receiving surface F of the photometric sensor 11. The adjustment of the distance between the photometric lens 10 and the photometric sensor 11 can be performed by rotating the male threaded portion 100 with the tab 101 provided on the male threaded portion 100 before mounting the holder 12 on the camera body 1.

The female threaded portion 122 of the holder 12 is divided into three sections in the direction of its circumference, with the three slits (not shown) that extend in the direction of its axis. With this, the female threaded portion 122 can expand and contract in the direction of the radius. If the state in which the female threaded portion 122 is not deformed due to elasticity, is set as the reference state, the pitch diameter of the female threaded portion 122 is set somewhat smaller than the pitch diameter of the male thread portion 100. Because of this, when the male threaded portion 100 is screwed into the female threaded portion 122, the female threaded portion 122 expands in the direction of the radius and with its elastic resilience, the male threaded portion 100 is under pressure toward the center of the radius and is thereby held fast. With this, play in the photometric lens 10 is prevented, and consequently, the distance between the photometric lens 10 and the photometric sensor 11 can be maintained reliably once it is adjusted. Also, even when the distance is adjusted during the process of mounting the photometric lens 10 and the photometric sensor 11 into the holder 12, it is not necessary to perform re-adjustment when mounting the holder 12 into the camera body 1.

At the three corners of the flange portion 120 of the holder 12, three screws 33, 34 and 35 are provided so that they can be screwed through the frame 32, which is an integrated part of the camera body 1 (refer to FIG. 3). The coil springs 36 are mounted coaxially on the external circumference of each of the screws 33 through 35 when they are screwed into the frame 32. The coil springs 36 are compressed when the screws 33 through 35 are screwed through the frame 32, and the holder 12 is pressed against the tops 33a through 35a of the screws 33 through 35 due to the resilience of the springs. With this, the holder 12 is supported on three points at the support height that corresponds to the amount that the screws 33 through 35 are screwed through the frame 32. The three screws 33 through 35 are positioned in such a manner that a line joining them will form a right angle triangle with the right angle being formed by the internal angle corresponding to the screw 33 when viewed from the direction of the axis (vertical direction in FIG. 1B). The line L1 that connects the support points provided by the screws 33, 34 for the holder 12 runs parallel to the long sides of the light receiving surface F of the photometric sensor 11 and the line L2 that connects the support points provided by the screws 33, 35 for the holder 12 runs parallel to the short sides of the photometric sensor 11.

Figure 2:
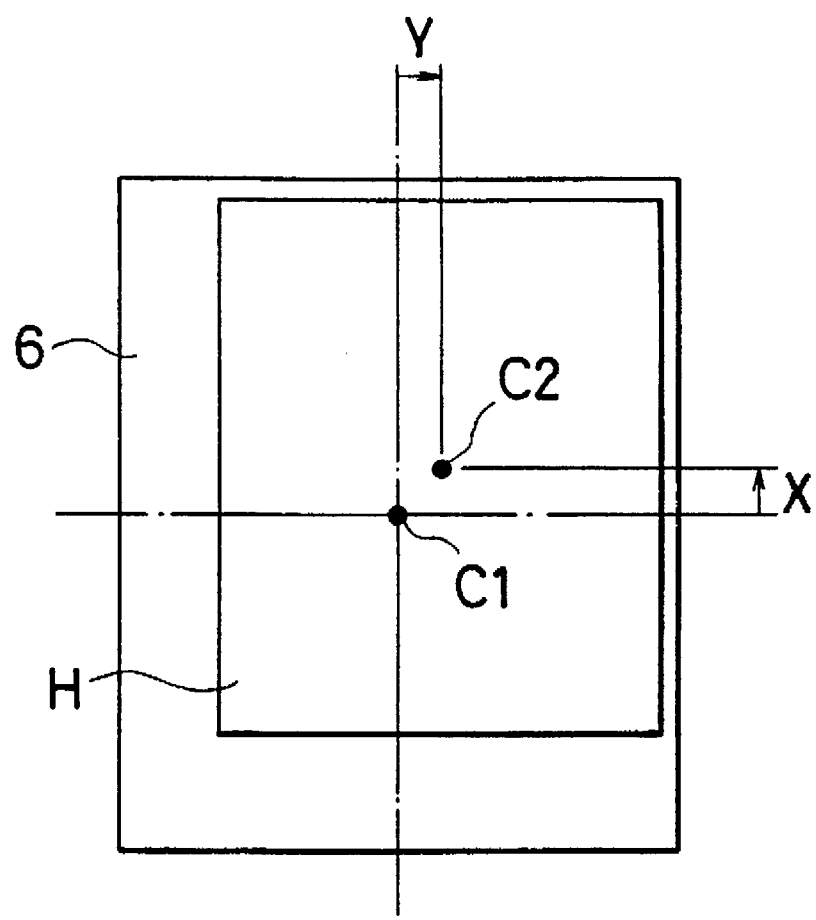
FIG. 2 shows a state in which the photometric range of the photometric sensor in FIGS. 1A and 1B is projected onto the viewfinder screen.

The relationship between the image created by projecting the light receiving surface of the photometric sensor 11 onto the viewfinder screen 6 via the photometric lens 10, the prism 9 and the pentaprism 7, and the viewfinder screen 6 itself, is illustrated in FIG. 2. As shown in the figure, when the center C1 of the viewfinder screen 6 and the center C2 of the projected image H of the light receiving surface of the photometric sensor 11 are not aligned, a deviation may be created between the photometric range which is verified by the photographer through the viewfinder and the actual photometric range as metered by the photometric sensor 11, making it impossible to achieve the optimum exposure for the desired subject. In particular, if only a part of the field (for example, a specific range at the center of the photographic field) is selected as the photometric range, the exposure may be wrong because the subject located in the photometric range that verified by the photographer through the viewfinder, may be different from the subject of photometering by the photometric sensor 11. To avoid this it is necessary to align the center C1 of the viewfinder screen 6 and the center C2 of the projected image H after the photometric device is mounted onto the camera body 1.

In the device in this embodiment, when the amount of screwing for the screw 34 is adjusted, the support height of the holder 12, supported by the spring 36 fitted on the screw 34, changes, and the holder 12 rotates with the line L2 as the rotation axis. With this, the projected image H in FIG. 2 travels in the direction X, indicated by the arrow in the figure, or in the opposite direction. On the other hand, when the amount of screwing for the screw 35 is adjusted, the support height of the holder 12, supported by the spring 36 fitted on the screw 35, changes, and the holder 12 rotates with the line L1 as the rotation axis. With this, the projected image H in FIG. 2 travels in the direction Y, indicated by the arrow in the figure, or in the Opposite direction. In other words, merely by adjusting the screwing amount for the screws 34, 35, the center C2 of the projected image H on the photometric sensor 11 can be aligned with the center C1 of the viewfinder screen 6. That is, the center of the secondary image formed on the photometric sensor 11 can be aligned to the center of the light receiving surface of the photometric sensor 11. Since the adjusting directions of the position of the secondary image using the screws 34, 35 are independent of each other, freedom of adjustment is thus afforded, and adjustment can be preformed with great precision.

In this embodiment, if the pitch of the screws 34, 35 is shortened, the distance that the secondary image travels against the amount of rotation of the screws 34, 35 is further reduced, thereby facilitating even finer adjustment of the position and attaining extremely high resolving power of the adjustment. In the prior art, in which adjustment is performed with a decentering pin, since the photometric sensor travels back and forth in one reciprocal trip in the direction of this positional adjustment when the decentering pin turns one cycle, the amount of positional adjustment performed by an adjustment tool such as a screwdriver against the amount of rotation of the tool is large and in this aspect too, resolving power is limited.

Although in this embodiment three springs 36 are used to support the holder 12, the support does not have to be provided by springs, but may be provided with a variety of types of members as long as they have enough elasticity to allow the inclination of the holder 12 to vary. The adjustment of the tilt, likewise, does not have to be provided by screws 34, 35, and a variety of means can be implemented in the present invention, such as a pair of inclined surfaces provided in the area where the holder 12 is supported on frame 32 wherein the support height adjustment is provided based upon the amount of deviation between the two surfaces in the direction of the inclination. If it is not necessary to adjust the distance between the photometric lens 10 and the photometric sensor 11, the adjustment mechanism may be omitted.

Thus far, an embodiment in which photoelectric conversion elements are used in the photometric sensor 11 for dividing the photometric range into a number of sections has been disclosed. However, the present invention is not restricted to this embodiment and if a high degree of freedom of positional adjustment in the photometric sensor 11 is desired, the present invention can be employed regardless of whether the photometric sensor 11 performs split metering or not. The present invention may also be adopted for cases in which it is necessary to adjust the image forming position of the secondary image on the photometric sensor 11 in one direction only.

I claim:

1. A photometric device for a camera comprising:

a photometric sensor that is internally provided in the camera body and that can perform photometry on the photographic field, a photometric lens that re-forms the primary image of the photographic field on the viewfinder screen of said camera, as a secondary image on said photometric sensor, and a tilt adjusting mechanism which integrally adjusts the inclination of said photometric lens and the inclination of said photometric sensor against the incident light rays entering said photometric lens so that said secondary image moves two-dimensionally on said photometric sensor, said tilt adjusting mechanism being constructed so that said inclination of said photometric lens and said inclination of said photometric sensor are performed around at least one axis which is located adjacent a periphery of said secondary image.

2. The photometric device for a camera according to claim 1 wherein:

said tilt adjusting mechanism is provided with a holding member that integrally holds said photometric lens and said photometric sensor, and a supporting mechanism which supports said holding member in such a manner that its inclination against the incident light rays entering said photometric lens is adjustable.

3. The photometric device for a camera according to claim 2 wherein:

said supporting mechanism is provided with a supporting member that supports said holding member in the direction of the incident light rays that enter said photometric lens at three points of support, and a support height-adjusting mechanism that adjusts the height of support provided by said supporting member for said holding member.

4. The photometric device for a camera according to claim 3 wherein:

said supporting member comprises an elastic member that supports said holding member in the direction that the incident light rays enter said photometric lens at three points, and said support height-adjusting mechanism is provided with an elastic deformation adjusting member that adjusts the amount of elastic deformation provided by said elastic member in the direction of the support for said holding member.

5. The photometric device for a camera according to claim 4 wherein:

said elastic member comprises coil springs that are fitted between said holding member and said camera body.

6. The photometric device for a camera according to claim 4 wherein:

said elastic deformation adjusting member comprises screws which are screwed from one side to the other between said holding member and said camera body so that said elastic member can be elastically deformed in the direction of the support for said holding member.

7. The photometric device for a camera according to claim 4 wherein:

said elastic member comprises coil springs that are fitted between said holding member and said camera body, and said elastic deformation adjusting member comprises screws which are screwed from one side to the other coaxially to said coil springs between said holding member and said camera body so that said elastic member can be elastically deformed in the direction of the support for said holding member.

8. The photometric device for a camera according to claim 3 wherein:

said supporting member supports said holding member at three points that are arranged so that a line connecting them will form a right angle triangle.

9. The photometric device for a camera according to claim 8 wherein:

the long sides and the short sides of the rectangular secondary image formed on said photometric sensor run parallel to the two sides of the right angle triangle that is formed by connecting the three points of support provided by said supporting member.

10. The photometric device for a camera according to claim 2 wherein:

said holding member can adjust the distance between said photometric lens and said photometric sensor.

11. The photometric device for a camera according to claim 10 wherein:

said holding member is provided with a holder to which said photometric sensor is secured and said photometric lens and said photometric sensor are held together by a male threaded portion, formed on the external circumference of said photometric lens being screwed into a female threaded portion formed on said holder.

12. A photometric device for a camera comprising:

a photometric sensor that is internally provided in the camera body and that can perform photometry on the photographic field, a photometric lens that re-forms the primary image of the photographic field on the viewfinder screen of the camera, as a secondary image on said photometric sensor, a holding member that integrally holds said photometric lens and said photometric sensor, a supporting member that supports said holding member in the direction of the incident light rays entering said photometric lens at three points, which are located adjacent a periphery of said secondary image and are arranged so that a line connecting them will form a right angle triangle, and a support height adjusting mechanism that adjusts the height of the support provided by said supporting member for said holding member so that said secondary image moves two-dimensionally on said photometric sensor.

13. The photometric device for a camera according to claim 12 wherein:

said supporting member comprises an elastic member, and said support height adjusting mechanism is provided with an elastic deformation adjusting member that adjusts the amount of elastic deformation provided by said elastic member in the direction of the support for said holding member.

14. The photometric device for a camera according to claim 13 wherein:

said elastic member comprises coil springs that are fitted between said holding member and said camera body.

15. The photometric device for a camera according to claim 13 wherein:

said elastic deformation adjusting member comprises screws which are screwed from one side to the other between said holding member and said camera body so that said elastic member can be elastically deformed in the direction of the support for said holding member.

16. The photometric device for a camera according to claim 13 wherein:

said elastic member comprises coil springs that are fitted between said holding member and said camera body, and said elastic deformation adjusting member comprises screws which are screwed coaxially with said coil springs from one side to the other between said holding member and said camera body so that said elastic member can be elastically deformed in the direction of support for said holding member.

17. The photometric device for a camera according to claim 12 wherein:

the long sides and the short sides of the rectangular secondary image formed on said photometric sensor run parallel to the two sides of the right angle triangle that is formed by a line connecting the three points of support provided by said supporting member.

18. The photometric device for a camera according to claim 12 wherein:

said holding member can adjust the distance between said photometric lens and said photometric sensor.

19. The photometric device for a camera according to claim 18 wherein:

said holding member is provided with a holder to which said photometric sensor is secured, and said photometric lens and photometric sensor are held together with a male threaded portion formed on the external circumference of said photometric lens being screwed into a female threaded portion formed on said holder.

20. A potometric device for a camera comprising:

a photometric sensor that is internally provided in the camera body and that can perform photometry on the photographic field, a photometric lens that re-forms the primary image of the photographic field on the viewfinder screen of the camera, as a secondary image on said photometric sensor, a holding member that integrally holds said photometric lens and said photometric sensor, coil springs that are fitted between said holding member and said camera body so that said holding member is supported in the direction of the incident light rays entering said photometric lens at three points that are located adjacent a periphery of said secondary image and are arranged so that a line connecting said three points will form a right angle triangle whose two sides are parallel to the long sides and short sides of the rectangular secondary image formed on said photometric sensor, and screws that are screwed from one side to the other coaxially with said coil springs between said holding member and said camera body so that said coil springs can be elastically deformed in the direction of the support for said holding member and said secondary image moves two-dimensionally on said photometric sensor.

21. The photometric device for a camera according to claim 20 wherein:

said holding member can adjust the distance between said photometric lens and said photometric sensor.

22. The photometric device for a camera according to claim 21 wherein:

said holding member is provided with a holder to which said photometric sensor is secured, and said photometric lens and said photometric sensor are held together with a male threaded portion formed on the external circumference of said photometric lens being screwed into a female threaded portion formed on said holder.

* * * * *